United States Patent
Na et al.

(10) Patent No.: US 9,900,781 B2
(45) Date of Patent: Feb. 20, 2018

(54) BASE STATION CONTROL DEVICE AND METHOD FOR OPERATING SAME

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Min Soo Na, Seongnam-si (KR); Young Lak Kim, Yongin-si (KR); Tae Guen Kim, Seongnam-si (KR); Tak Ki Yu, Yongin-si (KR); Sung Ho Moon, Anyang-si (KR); Soo Yong Choi, Seoul (KR); Tae Hyung Kim, Incheon (KR); Kyung Sik Min, Seoul (KR)

(73) Assignees: SK TELECOM CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/327,007

(22) PCT Filed: Jun. 26, 2015

(86) PCT No.: PCT/KR2015/006571
§ 371 (c)(1),
(2) Date: Jan. 17, 2017

(87) PCT Pub. No.: WO2016/010280
PCT Pub. Date: Jan. 21, 2016

(65) Prior Publication Data
US 2017/0325099 A1 Nov. 9, 2017

(30) Foreign Application Priority Data
Jul. 16, 2014 (KR) .......................... 10-2014-0090037

(51) Int. Cl.
*H04W 16/14* (2009.01)
*H04W 16/32* (2009.01)
*H04W 28/02* (2009.01)

(52) U.S. Cl.
CPC ........... *H04W 16/14* (2013.01); *H04W 16/32* (2013.01); *H04W 28/0247* (2013.01)

(58) Field of Classification Search
CPC .. H04W 16/14; H04W 16/32; H04W 28/0247
See application file for complete search history.

(56) References Cited

U.S. PATENT DOCUMENTS

| 2007/0066329 A1* | 3/2007 | Laroia ................. H04B 7/2678 455/502 |
| 2016/0066191 A1* | 3/2016 | Li ....................... H04W 72/082 455/443 |
| 2017/0118678 A1* | 4/2017 | Brisebois .............. H04W 28/08 |

FOREIGN PATENT DOCUMENTS

| KR | 10-2012-0130209 A | 11/2012 |
| KR | 10-2014-0009494 A | 1/2014 |
| KR | 10-2014-0080746 A | 7/2014 |

OTHER PUBLICATIONS

International Search Report dated Aug. 31, 2015 for PCT/KR2015/006571.

* cited by examiner

*Primary Examiner* — Duc C Ho
(74) *Attorney, Agent, or Firm* — Hauptman Ham, LLP

(57) ABSTRACT

The present invention discloses a base station control device which controls the base station management and the carrier aggregation (CA) function according to a heterogeneous network environment, such that an optimum system throughput can be obtained in the heterogeneous network environment through the CA function, and an operating method of the base station control device.

9 Claims, 4 Drawing Sheets

BASE STATION CONTROL DEVICE AND METHOD FOR OPERATING SAME

CROSS REFERENCE TO RELATED APPLICATION

This application is the National Phase application of International Application No. PCT/KR2015/006571, filed on Jun. 26, 2015, which is based upon and claims the benefits of priorities under 35 U.S.C § 119(a) of Korean Patent Application No. 10-2014-0090037, filed on Jul. 16, 2014, with the Korean Intellectual Property Office (KIPO), the entire contents of which are incorporated herein by reference.

TECHNICAL FIELD

The present invention relates to a base station control device which controls a base station management and a carrier aggregation (CA) function suitable for a heterogeneous network environment in which various base stations forming cells with different sizes coexist, such that an optimum system throughput can be obtained in the heterogeneous network environment through the CA function, and an operating method of the base station control device.

BACKGROUND ART

A long term evolution-advanced (LTE-A) communication system which can support high speed communications service over wider frequency bands than conventional LTE systems has been newly developed.

A carrier aggregation (CA) technology, which is one of key technologies of the LTE-A, is the technology which increases a system throughput by combining and operating two or more multiple unit frequency bands (component carriers, CC) thereby transmitting data using a wider bandwidth.

Therefore, as for a base station which operates with the frequency aggregation function (referred to as "CA function", hereinafter), it can use two or more frequency bands (CC) to increase a data transmission rate in proportion to the number of used frequency bands (CC).

Meanwhile, a heterogeneous network environment has recently emerged in which various base stations forming cells of different cells coexist in the same area. In this heterogeneous network environment, since various kinds of small base stations having smaller cell coverages than conventional macro base stations can be arranged, so that they form macro cells and small cells in an area where various kinds of base stations overlap to provide wireless communication service to users.

In this heterogeneous network environment, it is common that small cells are included in a macro cell, and, therefore, the macro base station and the small base station use different frequency bands in order to avoid interference; for example, the macro base station uses an f1 frequency band while the small base station uses an f2 frequency band.

In the meantime, when macro base station and the small base station operate with the CA function in the heterogeneous network environment, an increase in a system throughput will be expected for an area in which the macro base station and the small base station coexist when the macro base station additionally uses the f2 frequency band while the small base station additionally uses the f1 frequency band.

By the way, when the macro base station and the small base station operate with the CA function in the heterogeneous network environment, there can be a case in which the increase in the system throughput due to the CA function is not obtained since the interference increases when the macro base station and the small base station use the same frequency band.

Therefore, control of the base station management as well as the CA function which are proper for the heterogeneous network environment are required in order to obtain an optimum system throughput by using the CA function in the heterogeneous network environment.

DETAILED DESCRIPTION OF THE INVENTION

Technical Problem

An objective to be accomplished by the present invention is to provide a base station control device which controls the base station management and the carrier aggregation (CA) function suitable for a heterogeneous network environment, such that an optimum system throughput can be obtained in the heterogeneous network environment through the CA function, and an operating method of the base station control device.

Technical Solution

A base station control device according to an embodiment of the present invention comprises: a load acknowledging unit configured to acknowledge an overall load of base station in an operation-on state for a plurality of base stations having a carrier aggregation (CA) function using at least two frequency bands; a base station operating unit configured to control operation-on (On) or operation-off (Off) for each of the plurality of base stations according to the acknowledged overall load; and a CA operation mode control unit configured to determine the operation mode of the carrier aggregation (CA) function for the base station in an operation-on state differently according to the number of base station in an operation-on state among the plurality of base stations.

More particularly, the plurality of base stations include a macro base station, and at least one small base station which forms a cell included in a cell coverage of the macro base station, and the base station operating unit can control the operation-on or operation-off only for each of the at least one small base station among the plurality of base stations.

More particularly, the CA operation mode control unit can determine the operation mode of the carrier aggregation (CA) function which is set such that the smaller interference occurs as the number of base station in an operation-on state increases.

More particularly, the CA operation mode control unit can determine: a first operation mode of the carrier aggregation (CA) function, when the number of base station in an operation-on state is smaller than or equal to a first threshold number; a second operation mode of the carrier aggregation (CA) function, when the number of base station in an operation-on state is between the first threshold number and a second threshold number which is greater than the first threshold number; or a third first operation mode of the carrier aggregation (CA) function, when the number of base station in an operation-on state is greater than or equal to the second threshold number.

More particularly, the first operation mode of the first operation mode, the second operation mode, and the third operation mode is a mode at which a biggest interference occurs, while the third operation mode is a mode at which a smallest interference occurs.

More particularly, the base station in an operation-on state include a macro base station and at least one small base station which forms a cell included in a cell coverage of the macro base station, the first operation mode is a mode at which the macro base station and the at least one small base station equally use at least two frequency bands, the second operation mode is a mode at which, for at least one frequency band among the at least two frequency bands which are equally used at the first operation mode, the macro base station stops using the at least one frequency band, and the third operation mode is a mode at which, for a specific frequency band which is equally used by the macro base station and the at least one small base station at the second operation mode, the macro base station uses a portion of the specific frequency band while the at least one small base station uses the rest of the specific frequency band except for the portion of the frequency band.

More particularly, the base station operating unit can switch: at least one base station among the base station in an operation-off state to an operation-on state, when the acknowledged overall load is increased from an immediately preceding acknowledged overall load by a preset load threshold value or more; or at least one base station among the base station in an operation-on state to an operation-off state, when the acknowledged overall load is decreased from an immediately preceding acknowledged overall load by the load threshold value or more.

An operating method of a base station control device according to an embodiment of the present invention comprises: a load acknowledging step which, for a plurality of base stations having a carrier aggregation (CA) function using at least two frequency bands, acknowledges an overall load of base station in an operation-on state; a base station operating step which controls operation-on (On) or operation-off (Off) for each of the plurality of base stations according to the acknowledged overall load; and a CA operation mode controlling step which determines the operation mode of the carrier aggregation (CA) function for the base station in an operation-on state differently according to the number of base station in an operation-on state among plurality of base stations.

More particularly, the CA operation mode controlling step can determine the operation mode of the carrier aggregation (CA) function which is set such that the smaller interference occurs as the number of base station in an operation-on state increases.

More particularly, the base station operating step can control operation-on or operation-off only for each of the at least one small base station which is included in the plurality of base stations.

Advantageous Effects

According to the base station control device and the operating method thereof according to the present invention, base station management and the carrier aggregation (CA) function are controlled suitable for a heterogeneous network environment, so that an optimum system throughput can be obtained in the heterogeneous network environment through the CA function.

BEST MODE

Hereinafter, one embodiment of the present invention will be described in detail by referring to appended drawings.

Figure 1:
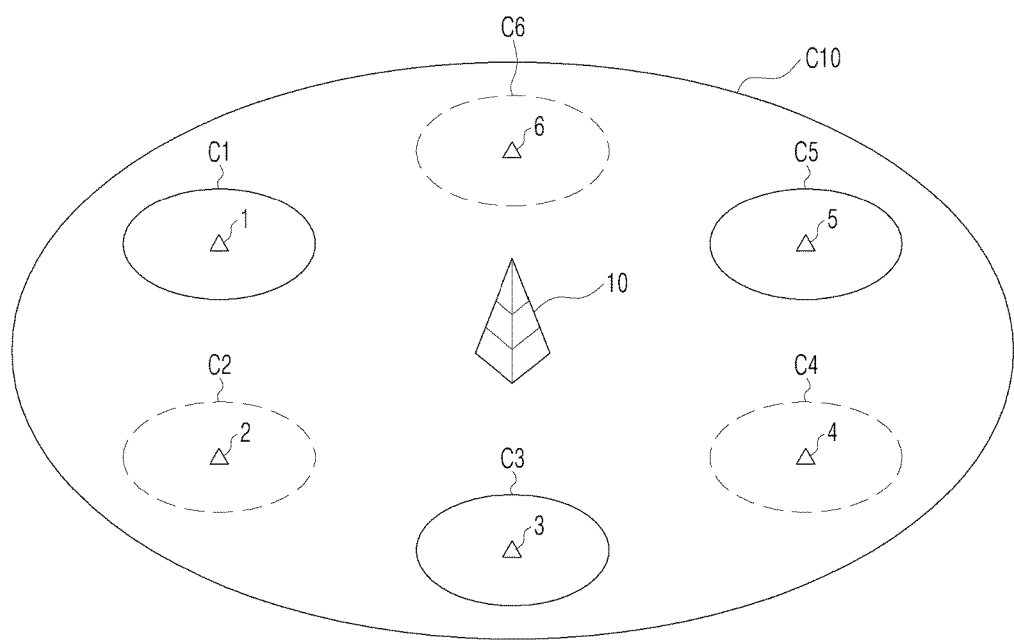
FIG. 1 is an illustration showing a heterogeneous network environment to which the present invention is applied.

FIG. 1 is a diagram which shows an example in which one macro base station 10 and a plurality of small base stations 1, 2, ..., 6 coexist.

As shown in FIG. 1, in the heterogeneous network environment to which the present invention applies, a macro base station 10 and the small base stations 1, 2, ..., 6 which form cells C1, C2, ..., C6 included in a cell coverage C10 of the macro base station 10 coexist.

It is needless to note that, in the heterogeneous network environment, various macro base stations including the macro base station 10 exist, and at least one small base station can exist in cells of respective macro base stations in the same way that small stations 1, 2, ..., 6 exist in the cell C10 of the macro base station 10.

However, for the sake of convenience of explanation, in the following, one macro base station 10 and small base stations 1, 2, ..., 6 existing in the cell C10 of the macro base station 10 as in FIG. 1 will be referred to throughout the description.

In this heterogeneous network environment, since small cells C1, C2, ..., C6 of small base stations 1, 2, ..., 6 are included in a macro cell C10 of the macro base station 10, the macro base station and the small base station use different frequency bands in order to avoid interference; for example, the macro base station 10 uses an f1 frequency band while the small base stations 1, 2, ..., 6 use an f2 frequency band.

Here, the f1 frequency band is advantageous to form a large coverage because of a relatively low frequency band with small loss due to distance, it is proper for macro cells.

On the other hand, since the f2 is a relatively high frequency band and has a big signal attenuation due to distance, and, therefore it is proper for small cells which form a small coverage.

Furthermore, the macro base station 10 and the small base stations 1, 2, ..., 6 have a carrier aggregation (CA) function which is the technology of increase the system throughput by combining and operating two or more multiple unit frequency bands (component carrier, CC) and transmitting data using a wider bandwidth.

That is to say, the macro base station 10 operates with the carrier aggregation (CA) function and it can additionally use at least one frequency band (for example: f2, f3 ...) along with the f1 frequency band as a basic CC. Also, the small base stations 1, 2, ..., 6 operate with the CA function and they can additionally use at least one frequency band (for example: f1, f3 ...) along with the f2 frequency band as a basic CC.

In this manner, the macro base station 10 and the small base stations 1, 2, ..., 6 operate with the CA function and they can increase the system throughput in an area where the macro base station 10 and the small base stations 1, 2, ..., 6 coexist.

By the way, when the macro base station and the small base station operate with the CA function in the heterogeneous network environment, there can be a case in which the increase in the system throughput due to the CA function is not obtained since the interference increases when the macro base station and the small base station use the same frequency band.

Therefore, the present invention is intended to propose a measure for base station management as well as operation control of the CA function which are proper for the heterogeneous network environment by obtaining the optimum system throughput using the CA function in the heterogeneous network environment in which the macro base station and the small base stations having CA function as described in the above coexist.

More particularly, the present invention proposes a base station control device which implements a measure for the base station management as well as the operation control of the CA function which are proper for the heterogeneous network environment.

In the following, the base station control device according to an embodiment of the present invention will be described in detail by referring to FIG. 2.

Figure 2:
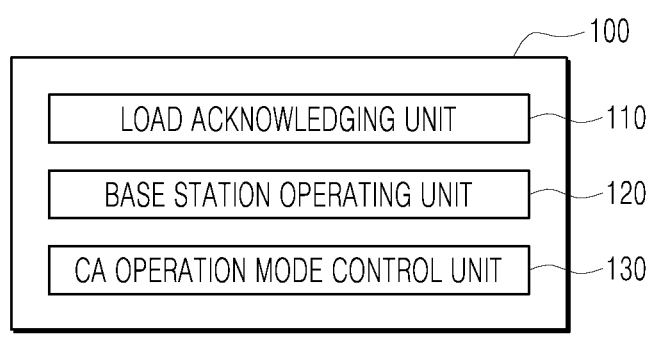
FIG. 2 is a block diagram which shows the configuration of the base station control device according to an embodiment of the present invention.

As shown in FIG. 2, base station control device 100 according to an embodiment of the present invention comprises: a load acknowledging unit 110 which, for a plurality of base stations having a carrier aggregation (CA) function using at least two frequency bands, acknowledges an overall load of base station in an operation-on state; a base station operating unit 120 which controls operation-on (On) or operation-off (Off) for each of the plurality of base stations according to the acknowledged overall load; and a CA operation mode control unit 130 which determines the operation mode of the carrier aggregation (CA) function for the base station in an operation-on state differently according to the number of base station in an operation-on state among the plurality of base stations.

The load acknowledging unit 110 acknowledges, for a plurality of base stations having the CA function, an overall load of base station in an operation-on state among the plurality of base stations.

Here, the plurality of base stations include the macro base station and at least one small base station which forms cells included in the cell coverage of the macro base station.

In the following, for the sake of convenience of explanation, explanation will be made by referring to a macro base station 10 and the small base stations 1, 2, . . . , 6 which exist in a cell C10 of the macro base station 10.

Therefore, the load acknowledging unit 110 acknowledges an overall load of the base station in an operation-on state for the macro base station 10 and the small base stations 1, 2, . . . , 6 having the CA function which are provided as examples in the above.

The base station control device 100 according to the present invention can control an operation-on (On) or operation-off (Off) state for each of the macro base station 10 and the small base stations 1, 2, . . . , 6.

In the meantime, it is preferred that the base station control device 100 according to the present invention basically maintains the macro base station 10 at the operation-on state all the time and controls the operation-on (On) or operation-off (Off) state only for the small base stations 1, 2, . . . , 6.

Therefore, the macro base station 10 can always be at the operation-on state, while some small base stations (for example: 1, 3, and 5) among the small base stations 1, 2, . . . , 6 included in the macro cell C10 can be at the operation-on state.

When the small base stations 1, 3, and 5 among the small base stations 1, 2, . . . , 6 included in the cell C10 are at the operation-on state as FIG. 1, the load acknowledging unit 110 can acknowledge the overall load of the macro base station 10 and the small base stations 1, 3, and 5 in an operation-on state among the plurality of base stations.

Here, the respective macro base stations including the macro base station 10 and the respective small base stations including the small base stations 1, 2, . . . , 6 in the heterogeneous network environment can be interconnected through a central base station managing system (not shown), such that the respective base stations (macro base stations, small base stations) can share a load status such as their traffic amount, number of connected terminals, etc. with other base stations.

And, the base station control device 100 according to the present invention can be interlinked with the aforementioned base station managing system (not shown) or can be a device which is included in the base station managing system (not shown).

Therefore, the load acknowledging unit 110 can acknowledge the overall load for the macro base station 10 and the small base stations 1, 2, . . . , 6 based on the load status of the macro base station 10 and the small base stations (for example: 1, 3, and 5) in the operation-on state which are acknowledged through the station managing system (not shown).

Here, the overall load can mean a load based on at least one an overall traffic amount and the overall number of connected terminals for the respective base stations (for example: the macro base station 10, the small base stations 1, 3, and 5).

The base station operating unit 120 controls the operation-on (On) or operation-off (Off) state for each of the macro base station 10 and the small base stations 1, 2, . . . , 6 based on the overall load which is acknowledged by the load acknowledging unit 110.

When described in more detail, it is preferred that the base station operating unit 120 basically maintains the operation-on state all the time for the macro base station 10 and controls the operation-on (On) or operation-off (Off) state only for the small base stations 1, 2, . . . , 6 according to the overall load which is acknowledged by the load acknowledging unit 110.

For example, the base station operating unit 120 sets at least one base station among the base station in an operation-off state to an operation-on state when the overall load, which is acknowledged by the load acknowledging unit 110, is increased from an immediately preceding acknowledged overall load by a preset load threshold value or more.

Meanwhile, the base station operating unit 120 sets at least one base station among the base station in an operation-on state to an operation-off state when the overall load, which is acknowledged by the load acknowledging unit 110, is decreased from an immediately preceding acknowledged overall load by the load threshold value or more.

As described in the above, explanation will be made by assuming that, among the respective small base stations 1, 2, . . . , 6 included in the macro cell C10, the small base stations 1, 3, and 5 are at the operation-on state while the small base station 2, 4, and 6 are at the operation-off state.

In this case, the base station operating unit 120 acknowledges whether the overall load, which is acknowledged by the load acknowledging unit 110, is increased from the immediately preceding acknowledged overall load by a load threshold value (η) or more, or whether the overall load, which is acknowledged by the load acknowledging unit 110, is decreased from the immediately preceding acknowledged overall load by the load threshold value (η) or more.

Therefore, the base station operating unit 120 can additionally set at least one base station (for example: 2) among base stations 2, 4, and 6 at the operation-off state to the operation-on state when the currently acknowledged overall load is increased from the immediately preceding acknowledged overall load by the preset load threshold value (η) or more.

Meanwhile, the base station operating unit 120 can additionally set at least one base station (for example: 3) among base stations 1, 3, and 5 at the operation-on state to the operation-off state when the currently acknowledged overall load is decreased from the immediately preceding acknowledged overall load by the preset load threshold value (η) or more.

In the meantime, the aforementioned load threshold value (η) is preferably a value which is statistically obtained beforehand in order to trigger the small base stations to the operation on/off state.

Like this, the base station control device 100 according to the present invention can dynamically control the operation-on/off states of the small base stations 1, 2, . . . , 6 based on the overall load of the base stations in the operation-on state in the heterogeneous network environment where the macro base station 10 and the small base stations 1, 2, . . . , 6 coexist, such that more small base stations can be activated and operated as the overall load increases, which can promote the increase in the system throughput.

By the way, in the heterogeneous network environment, interference can also increase as the number of activated small base stations increases, and the interference status changes according to the frequency band used by the CA function when the additional small base stations operate with the CA function, and, therefore, it can happen that the increase in the system throughput due to the CA function is not obtained as expected.

Therefore, the present invention is intended to obtain the optimum system throughput in the case of using the CA function by dynamically controlling the operation-on/off states of the small base stations 1, 2, . . . , 6 according to the load (traffic amount, number of connected terminals) in the heterogeneous network environment.

In order to accomplish this, the CA operation mode control unit 130 in the base station control device 100 according to the present invention determines the operation mode of the CA function for the base stations in the operation-on state differently according to the number of base station in the operation-on state among the macro base station 10 and the small base stations 1, 2, . . . , 6.

More particularly, the CA operation mode control unit 130 can determine the operation mode of the CA function which is set such that the smaller interference occurs as the number of base station in an operation-on state increases.

In the meantime, the number of the base station in the operation-on depends on how many of the small base stations are at the operation-on state.

It is because, as noted in the above, the macro base station 10 of the macro base station 10 and the small base station 1, 2, . . . 6 is always at the operation-on state and, therefore, is always counted as a base station which is fixed at the operation-on state.

Therefore, the CA operation mode control unit 130 can determine the operation mode of the CA function according to the number of small base station in the operation-on state among the macro base station 10 and the small base station 1, 2, . . . 6 such that the smaller interference will occur as the number of the small base station in the operation-o state increases.

And, as for the operation modes of the CA function, explanation will be made by referring to a first operation mode, a second operation mode, and a third operation mode as examples.

Here, the first operation mode of the first operation mode, the second operation mode, and the third operation mode is the mode at which a biggest interference occurs when compared with other operation modes, while the third operation mode is a mode at which the smallest interference occurs.

When the number of the small base stations (for example: 1, 3, and 5) which are at the operation-on state is smaller than or equal to a first threshold number μ1, the CA operation mode control unit 130 determines the first operation mode of the CA function, such that the macro base station 10 and the small base stations (for example: 1, 3, and 5) which are at the operation-on state operate the CA function at the first operation mode.

In the meantime, the first operation mode is the mode at which the macro base station 10 and the small base stations (for example: 1, 3, and 5) in the operation-on state equally use at least two frequency bands.

Meanwhile, when the number of the small base stations (for example: 1, 2, 3, 4, 5) which are at the operation-on state between the first threshold number μ1 and a second threshold number (μ2, μ1<μ2), the CA operation mode control unit 130 determines the second operation mode of the CA function, such that the macro base station 10 and the small base stations (for example: 1, 2, 3, 4, 5) which are at the operation-on state operate the CA function at the second operation mode.

In the meantime, the second operation mode is the mode at which the macro base station 10 stops using at least one frequency band of the at least two frequency bands which are equally used at the first operation mode.

Meanwhile, when the number of the small base stations (for example: 1, 2, 3, 4, 5, 6) which are at the operation-on state is greater than or equal to the second threshold number μ2, the CA operation mode control unit 130 determines the third operation mode of the CA function, such that the macro base station 10 and the small base stations (for example: 1, 2, 3, 4, 5, 6) which are at the operation-on state operate the CA function at the third operation mode.

In the meantime, the third operation mode is the mode at which, for the specific frequency band which are equally used by the macro base station 10 and the small base stations (for example: 1, 2, 3, 4, 5, 6) at the second operation mode, the macro base station 10 uses a portion of the specific frequency band while the small base stations (for example: 1, 2, 3, 4, 5, 6) use the rest specific frequency band except for the portion.

Preferably, the first threshold number μ1 and the second threshold number μ2 are statistically calculated beforehand for triggering the switching to the respective operation modes by using statistic values of the system throughput for the respective operation modes of the CA function.

Figure 3:
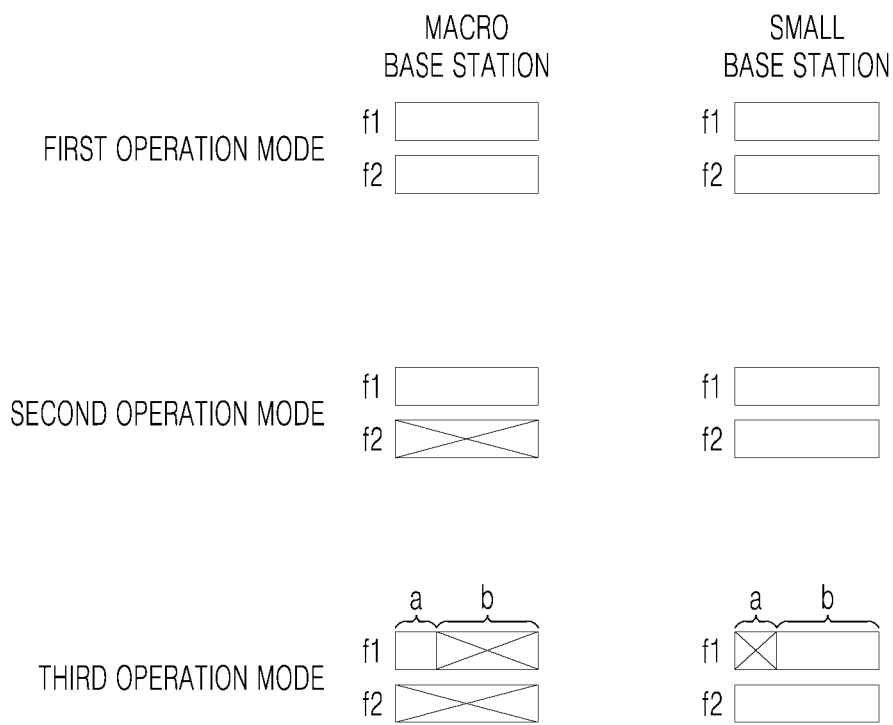
FIG. 3 is an illustration which shows various kinds of operation modes of the carrier aggregation (CA) function according to an embodiment of the present invention.

In the following, as shown in FIG. 3, the operation mode of the CA function will be described by using an example where the macro base station 10 and the small base stations 1, 2, . . . , 6 combine/operate two f1 f2 frequency bands through the CA function.

As shown in FIG. 3, in the first operation mode, both the macro base station 10 and the small base stations (for example: 1, 3, 5) in the operation-on state perform the CA function by equally using the the f1 frequency band and the f2 frequency band.

This first operation mode is the mode which is proper for a situation where a relatively small number of small base stations are set to the operation-on state according to the overall load. Although interference occurs in the frequency band which are used by the macro base station and the small base stations at the first operation mode, an increased amount in throughput due to the reuse of frequency is greater than attenuation in a signal-to-interference plus noise ratio (SINR), since the number of activated small base stations is small, which helps the overall system throughput to increase.

In the meantime, the second operation mode is the mode at which the macro base station 10 stops using the f2 frequency band of the frequency bands which are equally used at the aforementioned first operation mode.

As described in the above, when the macro base station 10 performs the CA function by only using the two f1 frequency band and the f2 frequency band, the macro base station 10 stops using the f2 frequency band at the second operation mode to use only the f1 frequency band without performing the CA function, and the small base stations (for example: 1, 2, 3, 4, 5) can still perform the CA function by using the f1 and f2 frequency bands.

This second operation mode is the mode which is proper for a situation when an adequate number of small base stations are activated according to the overall load, and, although interference exists between the macro base station and the small base stations in the f1 frequency band, there is no interference between the macro base station and the small base stations in the f2 frequency band.

That is to say, since the macro base station is not operated in the f2 frequency band at the second operation mode, the small base stations can experience relatively high SINR gains in the f2 frequency band, which helps the system throughput to increase.

Meanwhile, the third operation mode is the mode at which, for the f1 frequency band which was equally used at the aforementioned second operation mode, the macro base station 10 uses a portion (a) of the f1 frequency band, small base stations (for example: 1, 2, 3, 4, 5, 6) use the rest (b) of the f1 frequency band except for the portion (a).

As described in the above, when the macro base station 10 performs the CA function by only using the two f1 frequency band and the f2 frequency band, the macro base station 10 uses the portion (a) of the f1 frequency band without performing the CA function, and the small base stations (for example: 1, 2, 3, 4, 5, 6) can still perform the CA function by using the rest (b) of the f1 frequency band and the f2 frequency band.

What is to be noted about the third operation mode is that the macro base station and the small base stations separately use the f1 frequency band in an independent manner.

This third operation mode is the mode which is proper for a situation where a relatively large number of small base stations are activated according to the overall load. In the situation where the number of small base stations is very large, most of terminals are connected to the small base stations rather than to the macro base station by an offloading effect. In particular, when the terminal selects the base station to be connected to according to the quality of a received signal, a small number of terminals which are located at a center side of a macro cell and basically experience preferable signal reception quality from the macro base station are connected to the macro base station. Therefore, a portion (a) of the f1 frequency band can be allocated for the aforementioned small number of terminals, while the rest (b) of the f1 frequency band can be allocated for the CA function of the small base stations.

Therefore, in the third operation mode, since interference between the macro base station and the small base stations is removed in the f2 frequency band as in the second operation mode, the system throughput can be increased due to an SINR gain of the small base stations.

In this manner, the base station control device 100 according to the present invention can perform the base station management and the operation control of the CA function proper for the heterogeneous network environment. That is, the base station control device 100 according to the present invention can dynamically control the operation-on/off states of the small base stations according to the overall load in the heterogeneous network environment where the macro base station 10 and the small base stations 1, 2, . . . , 6 coexist, and control the switching to the CA function by considering the interference situation which varies according to the number of activated small base stations in the operation-on state.

Therefore, by using the base station control device according to the present invention, the base station management and the carrier aggregation (CA) function are controlled according to the heterogeneous network environment, which results in an effect of obtaining the optimum system throughput in the heterogeneous network environment through the CA function.

Figure 4:
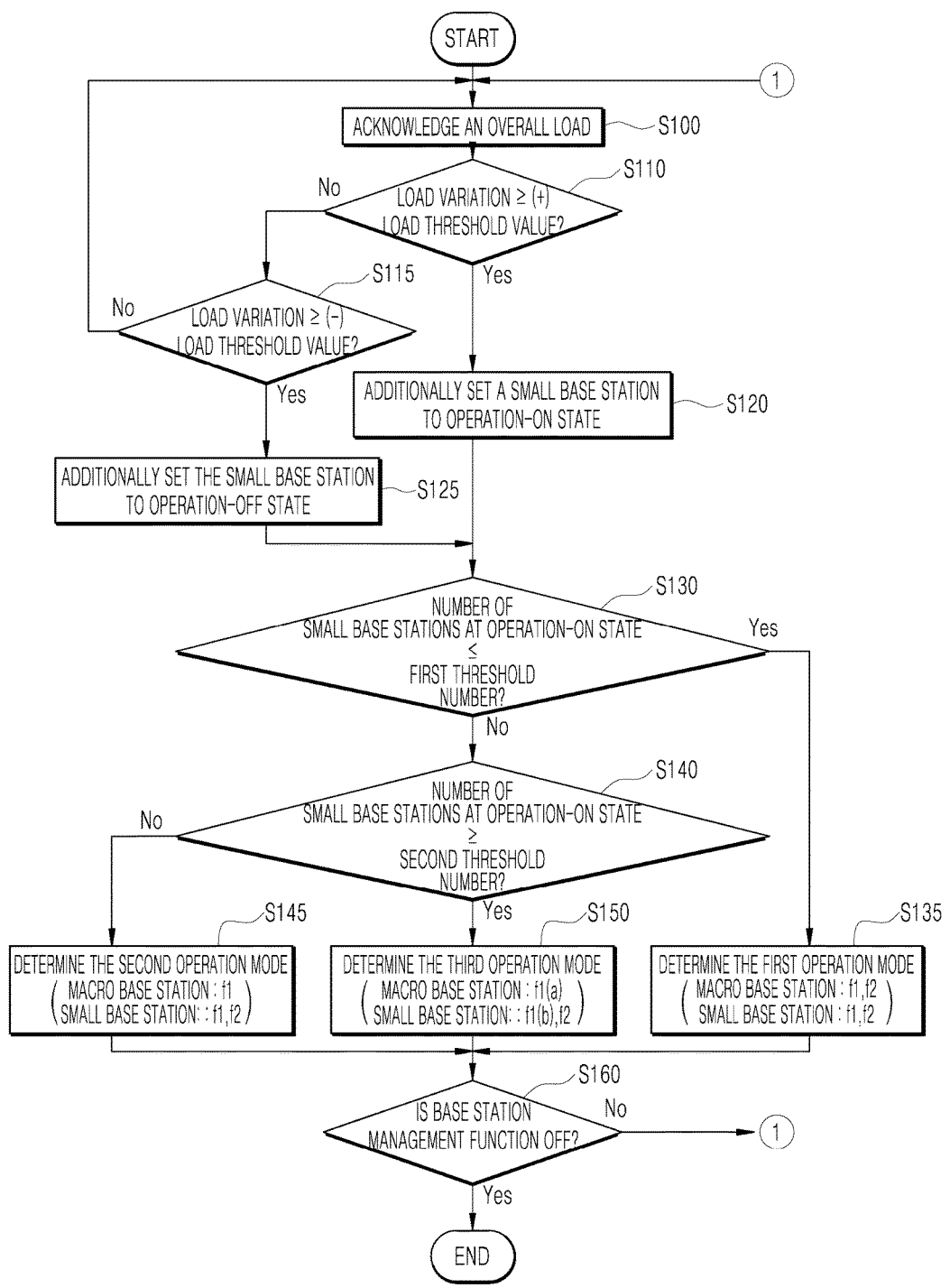
FIG. 4 is a control flowchart which shows the operating method of the base station control device according to one embodiment of the present invention.

In the following, an operating method of the base station control device according to an embodiment of the present invention will be described in detail by referring to FIG. 4. Here, reference numbers in FIGS. 1 to 3 will be referred to for the convenience of explanation.

The operating method of the base station control device 100 according to an embodiment of the present invention acknowledges, for a plurality of base stations having the CA function, an overall load of the base station in an operation-on state among the base stations (S100).

In the following, for the sake of convenience of explanation, explanation will be made by referring to a macro base station 10 and small base stations 1, 2, . . . , 6 which exist in a cell C10 of the macro base station 10.

Therefore, the operating method of the base station control device 100 according to an embodiment of the present invention acknowledges an overall load of the macro base station 10 and the small base station 1, 2, . . . , 6 in an operation-on state which are provided as examples in the above (S100).

Then, the operating method of the base station control device 100 according to an embodiment of the present invention determines whether the overall load which is acknowledged at S100 in increased from the immediately preceding acknowledged overall load by a preset load threshold value or more. In other words, the operating method of the base station control device 100 according to an embodiment of the present invention determines whether the load variation is greater than or equal to the load threshold value ($\eta$) (S110).

In the following, for the sake of convenience of explanation, explanation will be made by assuming that, among the respective small base stations 1, 2, . . . , 6 included in the macro cell C10, the small base stations 1, 3, and 5 are at the operation-on state while the small base station 2, 4, and 6 are at the operation-off state.

The operating method of the base station control device 100 according to an embodiment of the present invention can additionally set at least one small base station (for example: 2) among the small base stations 2, 4, and 6 at the operation-off state to the operation-on state, when the load variation is greater than or equal to the load threshold value (η)(S120).

Meanwhile, the operating method of the base station control device 100 according to an embodiment of the present invention determines whether the overall load which is acknowledged at S100 in decreased from the immediately preceding acknowledged overall load by a preset load threshold value or more. In other words, the operating method of the base station control device 100 according to an embodiment of the present invention determines whether the load variation is greater than or equal to the load threshold value (η) (S115).

The operating method of the base station control device 100 according to an embodiment of the present invention can additionally set at least one small base station (for example: 3) among the small base stations 1, 3, and 5 at the operation-on state to the operation-off state, when the load variation is greater than or equal to the load threshold value (η)(S125).

When the number of the small base stations which are set to the operation-on state through S120 or S125 varies, the operating method of the base station control device 100 according to an embodiment of the present invention determines the operation mode of the carrier aggregation function for the base stations in the operation-on state. In other words, the operating method of the base station control device 100 according to an embodiment of the present invention determines the CA function differently according to the number of small base stations in the operation-on state among the macro base station 10 and the small base stations 1, 2, . . . , 6.

In the following, as for the operation modes of the CA function, explanation will be made by referring to a first operation mode, a second operation mode, and a third operation mode as examples.

The operating method of the base station control device 100 according to an embodiment of the present invention determines whether the number of small base stations in the operation-on state is smaller than or equal to the first threshold number μ1 (S130).

When the number of the small base stations (for example: 1, 3, 5) in the operation-on state is smaller than or equal to the first threshold number μ1 (Yes in S130), the operating method of the base station control device 100 according to an embodiment of the present invention determines the first operation mode of the CA function, such that the macro base station 10 and the small base stations (for example: 1, 3, 5) in the operation-on state operate the CA function at the first operation mode (S135).

Therefore, when described by referring to FIG. 3, the macro base station 10 and the small base stations (for example: 1, 3, 5) in the operation-on state can perform the CA function by equally using the f1 frequency band and the f2 frequency band.

Meanwhile, the operating method of the base station control device 100 according to an embodiment of the present invention determines whether the number of small base stations in the operation-on state is greater than or equal to the second threshold number μ2 (S140).

When the number of the small base stations (for example: 1, 2, 3, 4, 5) in the operation-on state is between the first threshold number p1 and the second threshold number μ2 (S140 No), the operating method of the base station control device 100 according to an embodiment of the present invention determines the second operation mode of the CA function, such that the macro base station 10 and the small base stations (for example: 1, 2, 3, 4, 5) in the operation-on state operate the CA function at the second operation mode (S145).

Therefore, when described by referring to FIG. 3, among the macro base station 10 and the small base stations (for example: 1, 2, 3, 4, 5) in the operation-on state, the macro base station 10 stops using the f2 frequency band to use only the f1 frequency band without performing the CA function, and the small base stations (for example: 1, 2, 3, 4, 5) can still perform the CA function by using the f1 and f2 frequency bands.

Meanwhile, when the number of the small base stations (for example: 1, 2, 3, 4, 5, 6) in the operation-on state is greater than or equal to the second threshold number μ2 (Yes in S140), the operating method of the base station control device 100 according to an embodiment of the present invention determines the third operation mode of the CA function, such that the macro base station 10 and the small base stations (for example: 1, 2, 3, 4, 5, 6) in the operation-on state operate the CA function at the third operation mode (S150).

Therefore, when described by referring to FIG. 3, among the macro base station 10 and the small base stations (for example: 1, 2, 3, 4, 5, 6) which are at the operation-on state, the macro base station 10 uses a portion (a) of the f1 frequency band without performing the CA function, while the small base stations (for example: 1, 2, 3, 4, 5, 6) can still perform the CA function by using the rest (b) of the f1 frequency band and the f2 frequency band.

And, the operating method of the base station control device 100 according to an embodiment of the present invention will consistently perform a base station management function through aforementioned steps S100-S150 (1̂) as long as the base station management function through aforementioned steps S100-S150 is not turned off (S160 No).

As described in the above, by using the base station control device according to the present invention, the base station management and the carrier aggregation (CA) function are controlled according to the heterogeneous network environment, which results in an effect of obtaining the optimum system throughput in the heterogeneous network environment through the CA function.

The operating method of the base station control device according to the present invention can be embodied as program instructions executable by various computer means and recorded on a computer-readable medium. The computer-readable medium can include program instructions, data files, data structures, etc. exclusively or in combination. The program instructions recorded on the medium can be specifically designed and configured for the present invention or well known to be available by a skilled artisan in computer software. In the example of the computer-readable recording medium, magnetic media such as hard disks, floppy disks, and magnetic tapes, optical media such as compact disk-read only memories (CD-ROM), digital versatile disks (DVDs), magneto-optical media such as floptical disks, and hardware devices specially configured to store and execute program instructions such as read only memories (ROMs), random access memories (RAMs), flash memories, etc. are included. In the example of the computer instructions, machine language codes created by a compiler as well as a high level language code executable by a computer using an interpreter, etc. are included. The hardware device can be configured to operate as one or more software module for performing the operations of the present invention, and vice versa.

Although the present invention is described in detail by referring to preferred embodiments, the present invention is not restricted to these embodiments; and it is to be understood that the technical scope of the present invention encompasses the scope in which those skilled in the art can readily modify or change the embodiments without departing from the subject matter of the present invention defined in the appended claims.

The invention claimed is:

1. A base station control device comprising:
a load acknowledging unit configured to acknowledge an overall load of base station in an operation-on state for a plurality of base stations having a carrier aggregation (CA) function using at least two frequency bands;
a base station operating unit configured to control operation-on (On) or operation-off (Off) for each of the plurality of base stations according to the acknowledged overall load; and
a CA operation mode control unit configured to determine the operation mode of the carrier aggregation (CA) function for the base station in an operation-on state differently according to the number of base station in an operation-on state among the plurality of base stations.

2. The base station control device of claim 1, wherein: the plurality of base stations include a macro base station and at least one small base station which forms a cell included in a cell coverage of the macro base station; and
the base station operating unit controls the operation-on or operation-off for each of the at least one small base station among the plurality of base stations.

3. The base station control device of claim 1, wherein: the CA operation mode control unit determines the operation mode of the carrier aggregation (CA) function which is set such that the smaller interference occurs as the number of base station in an operation-on state increases.

4. The base station control device of claim 1, wherein the CA operation mode control unit determines:
a first operation mode of the carrier aggregation (CA) function, when the number of base station in an operation-on state is smaller than or equal to a first threshold number;
a second operation mode of the carrier aggregation (CA) function, when the number of base station in an operation-on state is between the first threshold number and a second threshold number which is greater than the first threshold number; or
a third first operation mode of the carrier aggregation (CA) function, when the number of base station in an operation-on state is greater than or equal to the second threshold number.

5. The base station control device of claim 4, wherein:
the base station in an operation-on state include a macro base station and at least one small base station which forms a cell included in a cell coverage of the macro base station;
the first operation mode is a mode at which the macro base station and the at least one small base station equally use at least two frequency bands;
the second operation mode is a mode at which, the macro base station stops using at least one frequency band among the at least two frequency bands which are equally used at the first operation mode; and
the third operation mode is a mode at which, for a specific frequency band which is equally used by the macro base station and the at least one small base station at the second operation mode, the macro base station uses a portion of the specific frequency band while the at least one small base station uses the rest of the specific frequency band except for the portion of the frequency band.

6. The base station control device of claim 1, wherein the base station operating unit:
switches at least one base station among the base station in an operation-off state to an operation-on state, when the acknowledged overall load is increased from an immediately preceding acknowledged overall load by a preset load threshold value or more; or
switches at least one base station among the base station in an operation-on state to an operation-off state, when the acknowledged overall load is decreased from an immediately preceding acknowledged overall load by the load threshold value or more.

7. An operating method of a base station control device comprising:
a load acknowledging step which acknowledges an overall load of base station in an operation-on state for a plurality of base stations having a carrier aggregation (CA) function using at least two frequency bands;
a base station operating step which controls operation-on (On) or operation-off (Off) for each of the plurality of base stations according to the acknowledged overall load; and
a CA operation mode controlling step which determines the operation mode of the carrier aggregation (CA) function for the base station in an operation-on state differently according to the number of base station in an operation-on state among the plurality of base stations.

8. The operating method of a base station control device of claim 7, wherein the CA operation mode controlling step determines the operation mode of the carrier aggregation (CA) function which is set such that the smaller interference occurs as the number of base station in an operation-on state increases.

9. The operating method of a base station control device of claim 7, wherein the base station operating step controls operation-on or operation-off for each of at least one small base station which is included in the plurality of base stations.

* * * * *